(12) United States Patent
Nalder

(10) Patent No.: US 6,223,216 B1
(45) Date of Patent: Apr. 24, 2001

(54) MESSAGE DATABASE MANIPULATION USING A SINGLE COMMAND TO EVOKE MULTIPLE OPERATIONS ON MULTIPLE MESSAGES

(75) Inventor: Gregory T. Nalder, Meridian, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/191,439

(22) Filed: Nov. 12, 1998

(51) Int. Cl.⁷ .................................................. G06F 15/16

(52) U.S. Cl. .......................... 709/217; 709/203; 709/206; 709/219

(58) Field of Search ................................... 709/203, 206, 709/217, 219

(56) References Cited

U.S. PATENT DOCUMENTS

| | | | |
|---|---|---|---|
| 5,844,969 | * 12/1998 | Goldman et al. | 379/93.24 |
| 5,905,777 | * 5/1999 | Foladare et al. | 379/90.01 |
| 5,938,726 | * 8/1999 | Reber et al. | 709/217 |
| 5,978,837 | * 11/1999 | Foladare et al. | 709/207 |
| 6,061,718 | * 5/2000 | Nelson | 709/206 |
| 6,101,531 | * 8/2000 | Eggleston et al. | 709/206 |

* cited by examiner

Primary Examiner—Saleh Najjar

(57) ABSTRACT

A communication device configured in accordance with the invention enables communication between a user and a message server that holds plural messages for the user. The communication device includes a processor that is responsive to a user's connection signal to establish communication with the message server and to receive a download from the message server of a list of message identifiers for plural messages awaiting a response by the user. The communication device includes a device for displaying the list of message identifiers, along with indications of potential actions which may be taken with respect to each message identifier. The display apparatus is preferably a printer which outputs a media sheet with the list of message identifiers and associated indicated actions. The communication device includes an input device that is adapted to receive user instructions regarding which of the actions is/are to be executed with respect to each message. The processor accumulates all of the user instructions for the plural messages and dispatches a single command message to the message server. The single command message passes the accumulated user instructions to the message server which responds by carrying out the actions instructed by the user. The preferred input device is a scanner which reads user instructions from the media sheet and inputs them to the processor.

15 Claims, 2 Drawing Sheets

New Messages for: Greg Nalder
Listed on: 2/28/98 at 7:45

40

| | See | Hear | Delete | ID | Date | Time | As | From | Subject: |
|---|---|---|---|---|---|---|---|---|---|
| 1. | ☒ | ☐ | ☐ | 123456 | 2/27/98 | 5:55PM | Email | Stuart_Johnson@Open | Team Meeting Schedule Changed |
| 2. | ☐ | ☒ | ☒ | 234567 | 2/27/98 | 4:30PM | Voice | 208 396-7096 | Hi Greg. Please call me back at home whe |
| 3. | ☒ | ☐ | ☐ | 345678 | 2/27/98 | 10:45AM | Fax | 415 222-7845 | Detail of schematic per our discussion |
| 4. | ☒ | ☐ | ☒ | 456789 | 1/15/98 | 1:22PM | Fax | Smith Barney 415 847-66 | Stock sale confirmation |
| 5. | ☐ | ☐ | ☒ | 012345 | 12/22/97 | 9:13AM | Email | Gnalder@boi.hp.com | Patent disclosures |

New Messages for: Greg Nalder
Listed on: 2/28/98 at 7:45

| See | Hear | Delete | ID | Date | Time | As | From | Subject: |
|---|---|---|---|---|---|---|---|---|
| 1. ☒ | ☐ | ☐ | 123456 | 2/27/98 | 5:55PM | Email | Stuart Johnson@Open | Team Meeting Schedule Changed |
| 2. ☐ | ☒ | ☒ | 234567 | 2/27/98 | 4:30PM | Voice | 208 396-7096 | Hi Greg. Please call me back at home whe |
| 3. ☒ | ☐ | ☐ | 345678 | 2/27/98 | 10:45AM | Fax | 415 222-7845 | Detail of schematic per our discussion |
| 4. ☒ | ☐ | ☒ | 456789 | 1/15/98 | 1:22PM | Fax | Smith Barney 415 847-66 | Stock sale confirmation |
| 5. ☐ | ☐ | ☒ | 012345 | 12/22/97 | 9:13AM | Email | Gnalder@boi.hp.com | Patent disclosures |

MESSAGE DATABASE MANIPULATION USING A SINGLE COMMAND TO EVOKE MULTIPLE OPERATIONS ON MULTIPLE MESSAGES

FIELD OF THE INVENTION

This invention relates to a method and apparatus for enabling a communication device to communicate with a message server holding plural user messages and, more particularly, to a communication device which dispatches a single input command structure to instruct a message server regarding actions to take with respect to plural messages awaiting a user's response.

BACKGROUND OF THE INVENTION

Messaging systems, including voice mail and E-mail, require the presence of a personal computer with software to enable the creation and maintenance of a communication link with a central message server. Such personal computers are also able to receive facsimile messages into memory from such a server and then to output, via a captive printer, the printed fax message or to display the fax message on an associated monitor. In each instance, the messages are manipulated and controlled, one at a time, via user interaction with a list of messages that are displayed on the computer's monitor.

Laptop computers provide the user with the facility to access message servers while the user is traveling. Such laptop computers are, however, relatively expensive and provide much more functionality than is needed to accomplish the user/message server interaction. Further, to accomplish a connection to the message server, whether via the Internet or via a private network, requires that the user input a series of commands, passwords, and messages that enable the interconnection to be established and maintained. Such input signaling is generally done via a keyboard or a mouse/visual interface.

The prior art has utilized various methods of inputting control signals to data handling apparatus such as copiers, printers, facsimiles, etc. In addition to keyboards, graphical input devices, voice recognition, etc, media sheets with instruction markings thereon have been used to input command data via a scanner input. Such media sheets enable the user to mark instruction data on the sheet, which sheet is then scanned into the respective apparatus. Software within the apparatus recognizes the specific command markings and reacts accordingly (e.g., setting up default parameters).

There is a need for a relatively inexpensive portable communication device that enables communications with various message servers. Such a communication device should provide the user with an ability to access message data from a message server and to dispatch messages to the message server in a manner that minimize connection time—and thus communication charges.

SUMMARY OF THE INVENTION

A communication device configured in accordance with the invention enables communication between a user and a message server that holds plural messages for the user. The communication device includes a processor that is responsive to a user's connection signal to establish communication with the message server and to receive a download from the message server of a list of message identifiers for plural messages awaiting a response by the user. The communication device includes a device for displaying the list of message identifiers, along with indications of potential actions which may be taken with respect to each message identifier. The display apparatus is preferably a printer which outputs a media sheet with the list of message identifiers and associated indicated actions. The communication device includes an input device that is adapted to receive user instructions regarding which of the actions is/are to be executed with respect to each message. The processor accumulates all of the user instructions for the plural messages and dispatches a single command message to the message server. The single command message passes the accumulated user instructions to the message server which responds by interpreting the instructions and carrying out the actions instructed by the user. The preferred input device is a scanner which reads user instructions from the media sheet and inputs them to the processor.

BRIEF DESCRIPTION OF THE DRAWINGS

FIG. 2 is an exemplary message output from the communication device which enables entry of instructions to execute one or more actions with respect to each message.

DETAILED DESCRIPTION OF THE INVENTION

Figure 1:
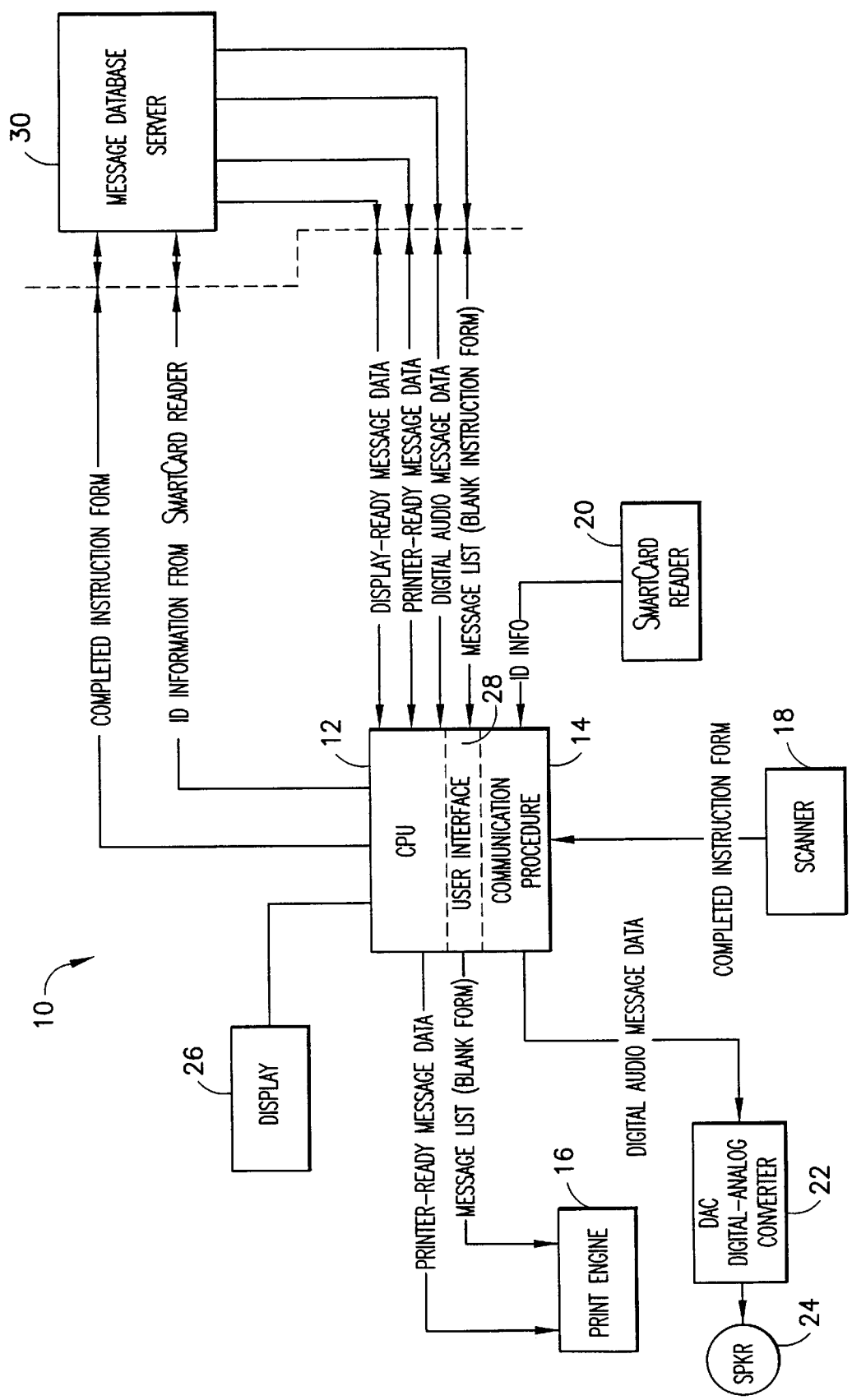
FIG. 1 is a block diagram of a communication device incorporating the invention.

Referring to FIG. 1, communication device 10 incorporates a central processing unit (CPU) 12 that is provided with a communication procedure 14. Communication device 10 further includes a print engine 16, a scanner 18, a smart card reader 20 and a digital to analog converter (DAC) 22, all of which are coupled to CPU 12. The output from DAC 22 feeds a speaker 24. Communication device 10 may also be provided with a display 26.

Print engine 16 is preferably a low-cost printer, such as an inkjet or laser printer which is adapted to output either media sheets from a sheet supply or from a roll of media. Scanner 18 is adapted to scan an input document sheet and to download the scanned document sheet, as raster image data to CPU 12. Smart card reader 20 provides a facility for enabling a user to insert both user identification data and a command to invoke communication procedure 14 to set up a communication channel between communication device 10 and a message database server 30.

A user interface 28 is associated with CPU 12 and enables entry of other user data for the purpose of controlling communication device 10. A principal intended use of communication device 10 is for connection to the public switched telephone network so as to enable access, via either the Internet or a private network, to message database server 30.

While FIG. 1 shows a plurality of message lines connecting CPU 12 and message database server 30, they are shown only to illustrate the particular messages that pass therebetween. Each of the indicated messages is actually carried on a single twisted pair conductor between CPU 12 and server 30.

Communication procedure 14 is configured to enable CPU 12 to request a download of a listing of all messages awaiting user response from message database server 30. It is preferred that the message listing be downloaded in the form of a single "instruction form" which lists each of the messages and associates with each message, one or more potential actions which may be executed by message database server 30 with respect to the message.

An exemplary instruction form 40 is shown in FIG. 2 and includes names of actions that may be executed by server 30 with respect to each listed message, i.e., See, Hear and Delete. Beneath each action name and associated with each message identifier is a box which, when marked by the user and transmitted to server 30, is recognized as a command to carry out the particular indicated action. More particularly, each line of instruction form 40 lists a message that awaits response by the user. The name of the originator of the message and the date and time the message was transmitted are recorded on the message line. Each message line further identifies whether the message was transmitted as E-mail, voice or fax, as well as an indication of the subject of the message (i.e., a brief description of the contents of the associated message). Recall that actual message has not yet been downloaded from message database server 30.

Upon logging on to message database server 30, server 30 downloads to CPU 12 instruction form 40 with a listing of messages that await action by the identified user. In the preferred mode, the instruction form is printed out by print engine 16. The instruction form indicates to the user not only the messages awaiting the user's attention, but also indicates actions that may be taken with respect to each message, e.g., either seeing the message, hearing it played, or deleting it. The user may select one or more of the indicated actions by placing an X or other mark in the box immediately below the desired action. For instance, the user may ask for a message to be downloaded as printer-ready data or as audio data, even though the data resides on server 30 as text data. Alternatively, if the message is stored on the server 30 as audio data, the user may request that it be converted and downloaded as printer ready data or display ready data, etc.

Once the user has examined all of the messages entries and designated one or more actions with respect to each message entry, the user feeds the instruction form sheet into scanner 18 for transmission as raster data back to message database server 30. Since message database server 30 is the instrumentality which configures the instruction form, it is able to sense and decode the specific action markings and to associate the requested action(s) with the respective messages. Accordingly, message database server 30 is able to respond to each of the requested actions by executing the particular action indicated by the user. If the message is indicated as being in "voice" format at message database server 30, it may be downloaded as either voice encoded data for play through speaker 24; as imaged text data (i.e., a fax) for output by print engine 16; or as encoded data for display by display 26 and editing by a word processing package (if desired). Similarly, the Email and Fax designated data formats may be likewise downloaded in any of the aforementioned formats.

For example, message 2 is indicated as being a voice message. Accordingly, by recognizing the selection of the "hear" and "delete" actions with respect to message 2, message database server 30 feeds message 2, in digital audio message form, back to communication device 10 for play via DAC 22 and speaker 24. Thereafter, message 2 is deleted from server 30. Similarly, by recognizing a See action instruction associated with message 1, the corresponding E-mail message is downloaded as a printer-ready message to CPU 12 which, in turn, causes print engine 16 to output a media page with the E-mail message. In similar fashion, the See action instruction is recognized with respect to message 3, causing it to be downloaded as a printer ready message and to be output from print engine 16.

Optionally, communication device 10 may be provided with a display 26 which is utilized to display one or more messages that are downloaded from database server 30. In this case, however, an indication from smart card reader 20 is fed, along with the user identifier information, to message database server 30 and indicates that the downloaded data is to be fed in display-ready format rather than in print-ready format. Accordingly, the messages that are to be seen by the user at communication device 10 are downloaded in a display format.

It is to be understood that the configuration of communication procedure 14 and message database server 30 enable the instruction form of FIG. 2 to be downloaded in one message transmission, thereby enabling the user to see all of the messages that are awaiting a response. Further, all of the user's instructions with respect to the listed messages are dispatched to message database server 30 as a single message. Thus, the prior art technique of multiple communications being required to access the multiple messages awaiting response is avoided. Further, since message database server 30 formats the blank instruction form, along with the message list, it is already configured to recognize the action command responses when the completed instruction form is sent back to it.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A communication device for communicating with a message server that is adapted to store plural messages for a user, said communication device comprising:

processor means responsive to a user's connection signal to establish a communication path with said message server and to receive a download of a list of message identifiers for plural messages awaiting a response from said user;

means for displaying said list of message identifiers, and, for each of said message identifiers, a plurality of associated potential actions;

input means for receiving user instructions indicating which of said plurality of associated potential actions is to be executed with respect to each said message associated with a message identifier, wherein, for each of said messages, said user instructions may indicate one or more of said plurality of associated potential actions; and program means for controlling said processor means to accumulate all of said user instructions for said plural messages and to dispatch to said message server a single message including said accumulated user instructions to enable said message server to execute, for each of said messages, each of said indicated plurality of associated potential actions.

2. The communication device as recited in claim 1, wherein said means for displaying comprises an electric display that manifests said list of message identifiers, along with said one or more potential actions associated with each message identifier.

3. The communication device as recited in claim 2, wherein said electronic display manifests areas which, if selected by a user through actuation of said imput means, indicate instructions regarding actions to be executed with respect to messages on said electronic display.

4. The communiaction device as recited in claim 3, wherein said processor means, upon receiving said download of said list of message identifiers, further receives data configuring message data to be shown on said electronic display and areas adapted to be subjected to selection by said user.

5. The communication device as recited in claim 1, wherein said message server, in accordance with said user instructions, transmits said messages formatted for any of (a) printing, (b) play as audio, or (c) as symbolically encoded data suitable for display or editing, and wherein said communication device further comprises audio output means for broadcasting audio data that is downloaded in response to execution of a user indication by said message server.

6. The communication device as recited in claim 1, further comprising:

identifier means for inputting a user identification and a user connection signal to said processor.

7. The communication device as recited in claim 6, wherein said identifier means comprises a card having embedded data regarding said user identification and said user connection signal.

8. A communication device for communicating with a message server that is adapted to store plural messages for a user, said communication device comprising:

processor means responsive to a user's connection signal to establish a communication path with said message server and to receive a download of a list of message identifiers for plural messages awaiting a response from said user;

means for displaying said list of message identifiers, along with one or more potential actions associated with each message identifier;

input means for receiving user instructions regarding which of said potential actions is/are to be executed with respect to each said message associated with a message identifier; and program means for controlling said processor means to accumulate all of said user instructions for said plural messages and to dispatch to said message server a single message including said accumulated user instructions for each of said plural messages to enable said message server to execute actions in accord with said accumulated user instructions, wherein said means for displaying comprises a printer that outputs a media sheet upon which is printed said list of message identifiers, along with said one or more potential actions associated with each message identifier, and said input means is scanner means for reading marks on said media sheet.

9. The communication device as recited in claim 8, wherein said media sheet includes areas which, if marked by a user, indicate instructions to perform associated actions with respect to specific messages listed on said media sheet.

10. The communication device as recited in claim 9, wherein said processor means, upon receiving said download of said list of message identifiers, further receives data configuring said media sheet and areas adapted to be marked by said user.

11. A method for enabling a communication device to communicate with a message server that is adapted to store plural messages for a user, said method comprising the steps of:

a) responding to a user's connection signal by establishing a communication path with said message server and receiving a download of a list of message identifiers for plural messages awaiting a response from said user;

b) displaying said list of message identifiers, and, for each of said message identifiers, a plurality of associated potential actions;

c) receiving user instructions indicating which of said plurality of associated potential actions is to be executed with respect to each said message associated with a message identifier, wherein, for each of said messages, said user instructions may indicate one or more of said plurality of associated potential actions;

d) accumulating all of said user instructions for said plural messages; and e) dispatching to said message server a single message including said accumulated user instructions for each of said plural messages, said message server thereby enabled to execute, for each of said messages, each of said indicated plurality of associated potential actions.

12. The method as recited in claim 11, wherein step b) displays said list of message identifiers by printing a media sheet upon which is printed said list of message identifiers, along with said one or more potential actions associated with each message identifier.

13. The method as recited in claim 11, wherein said user instructions received in step c) instructs said message server to transmit a message formatted for either printing, for play as audio, or as symbolically encoded data suitable for display or editing.

14. The method as recited in claim 11, further comprising the step of:

f) receiving from said message server, plural messages in accord with said accumulated user instructions, received ones of said plural messages formatted for display by one of printing or showing on a computer monitor, or for audio play, notwithstanding a format in which said plural messages are stored at said message server.

15. A method for enabling a communication device to communicate with a message server that is adapted to store plural messages for a user, said method comprising the steps of:

responding to a user's connection signal by establishing a communication path with said message server and receiving a download of a list of message identifiers for plural messages awaiting a response from said user;

b) displaying said list of message identifiers, along with one or more potential actions associated with each message identifier;

c) receiving user instructions regarding which of said potential actions is/are to be executed with respect to each said message associated with a message identifier;

d) accumulating all of said user instructions for said plural messages; and e) dispatching to said message server a single message including said accumulated user instructions for each of said plural messages, said message server thereby enabled to execute actions in accord with said accumulated user instructions, wherein step b) displays said list of message identifiers by printing a media sheet upon which is printed said list of message identifiers, along with said one or more potential actions associated with each message identifier, and wherein step e) dispatches to said message server said single message by scanning said media sheet and transmitting data from said media sheet as facsimile image data.

* * * * *